United States Patent
Ljung et al.

(10) Patent No.: US 9,820,016 B2
(45) Date of Patent: Nov. 14, 2017

(54) METHODS OF COMMUNICATING IDENTIFICATION INFORMATION AND A RESPONSIVE COMMAND VIA SHORT-RANGE COMMUNICATIONS, AND RELATED DEVICES

(71) Applicant: Sony Corporation, Tokyo (JP)

(72) Inventors: Peter Ljung, Lund (SE); Johan Wadman, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 732 days.

(21) Appl. No.: 13/795,424

(22) Filed: Mar. 12, 2013

(65) Prior Publication Data

US 2013/0210360 A1    Aug. 15, 2013

Related U.S. Application Data

(63) Continuation-in-part of application No. 13/818,479, filed as application No. PCT/IB2012/000256 on Feb. 13, 2012.

(51) Int. Cl.
    *H04Q 9/00*      (2006.01)
    *H04B 7/24*      (2006.01)
    (Continued)

(52) U.S. Cl.
    CPC ............... *H04Q 9/00* (2013.01); *H04B 7/24* (2013.01); *H04L 67/12* (2013.01); *H04L 67/125* (2013.01);
    (Continued)

(58) Field of Classification Search
    CPC .. H04M 1/7253; H04M 2250/12; H04B 7/24; H04L 67/125; H04L 63/0428; H04L 67/12; H04W 4/008; H04W 12/02; H04W 76/023; H04W 12/06; H04W 84/18; H04W 88/04; H04Q 9/00; H04Q 2209/40
    (Continued)

(56) References Cited

U.S. PATENT DOCUMENTS 6,957,107 B2 * 10/2005 Rogers et al. ................ 607/60
7,289,761 B2 * 10/2007 Mazar ............................ 455/1
(Continued)

OTHER PUBLICATIONS

Opperman et al., "A Generic NFC-enabled Measurement System for Remote Monitoring and Control of Client-side Equipment", 2011 Third International Workshop on Near Field Communication, IEEE, Feb. 22, 2011, pp. 44-49.
(Continued)

*Primary Examiner* — Pablo Tran
(74) *Attorney, Agent, or Firm* — Myers Bigel, P.A.

(57) ABSTRACT

Methods of operating a short-range Radio Frequency (RF) device are provided. The methods may include transmitting identification information that identifies the short-range RF device and/or sensor information generated by a sensor associated with the short-range RF device, using a short-range RF communication protocol. The methods may include receiving a command, responsive to the identification information and/or the sensor information, from a server via a first device using the short-range RF communication protocol to control a second device associated with the short-range RF device. Related devices are also provided.

19 Claims, 17 Drawing Sheets

(51) Int. Cl.
*H04W 4/08* (2009.01)
*H04W 12/02* (2009.01)
*H04M 1/725* (2006.01)
*H04L 29/08* (2006.01)
*H04W 4/00* (2009.01)
*H04W 88/04* (2009.01)
*H04L 29/06* (2006.01)
*H04W 12/06* (2009.01)
*H04W 84/18* (2009.01)
*H04W 76/02* (2009.01)

(52) U.S. Cl.
CPC ......... *H04M 1/7253* (2013.01); *H04W 4/008* (2013.01); *H04W 12/02* (2013.01); *H04L 63/0428* (2013.01); *H04M 2250/12* (2013.01); *H04Q 2209/40* (2013.01); *H04W 12/06* (2013.01); *H04W 76/023* (2013.01); *H04W 84/18* (2013.01); *H04W 88/04* (2013.01)

(58) Field of Classification Search
USPC ............... 455/41.2, 404.2, 41.3, 414.2, 415, 455/418–420, 423, 425, 432.1, 435.1, 455/440, 456.3, 461
See application file for complete search history.

(56) References Cited

U.S. PATENT DOCUMENTS

| | | | |
|---|---|---|---|
| 7,395,117 B2* | 7/2008 | Mazar et al. | 607/60 |
| 9,230,241 B1 | 1/2016 | Singh et al. | |
| 2005/0145187 A1 | 7/2005 | Gray | |
| 2006/0082444 A1 | 4/2006 | Sweeney | |
| 2006/0154642 A1* | 7/2006 | Scannell | 455/404.1 |
| 2006/0253894 A1* | 11/2006 | Bookman et al. | 726/2 |
| 2006/0267731 A1 | 11/2006 | Chen | |
| 2008/0004904 A1* | 1/2008 | Tran | 705/2 |
| 2008/0109051 A1* | 5/2008 | Splinter et al. | 607/60 |
| 2008/0189142 A1 | 8/2008 | Brown et al. | |
| 2008/0294019 A1* | 11/2008 | Tran | 600/301 |
| 2009/0058635 A1 | 3/2009 | LaLonde et al. | |
| 2009/0121890 A1 | 5/2009 | Brown et al. | |
| 2009/0289776 A1 | 11/2009 | Moore et al. | |
| 2011/0092164 A1 | 4/2011 | Spanhake | |
| 2011/0185202 A1 | 7/2011 | Black et al. | |
| 2011/0227707 A1 | 9/2011 | Zhu | |
| 2013/0035077 A1 | 2/2013 | Tsai | |
| 2013/0094538 A1 | 4/2013 | Wang | |
| 2013/0145420 A1 | 6/2013 | Ting | |

OTHER PUBLICATIONS

Notification of Transmittal of the International Search Report and the Written Opinion of the International Searching Authority, or the Declaration, in corresponding PCT Application No. PCT/JP2014/000712, dated May 14, 2014 (12 pages).

Notification Concerning Transmittal of International Preliminary Report on Patentability in corresponding PCT Application No. PCT/IB2012/000256 dated Aug. 28, 2014 (11 pages).

Notification of Transmittal of the International Search Report and the Written Opinion of the International Searching Authority, or the Declaration, PCT/IB2012/000256, dated Jan. 8, 2013.

Communication, European Patent Application No, 14 711 322.9; dated Jul. 15, 2016, 8 pages.

Communication, European Patent Application No. 14 711 322.9, dated Feb. 20, 2017, 6 pages.

* cited by examiner

METHODS OF COMMUNICATING IDENTIFICATION INFORMATION AND A RESPONSIVE COMMAND VIA SHORT-RANGE COMMUNICATIONS, AND RELATED DEVICES

RELATED APPLICATIONS

The present application claims the benefit of priority as a Continuation-In-Part of U.S. application Ser. No. 13/818,479, entitled "ELECTRONIC DEVICES, METHODS, AND COMPUTER PROGRAM PRODUCTS FOR DETECTING A TAG HAVING A SENSOR ASSOCIATED THEREWITH AND RECEIVING SENSOR INFORMATION THEREFROM," filed on Feb. 22, 2013, which is a 35 U.S.C. §371 national stage application of PCT International Application No. PCT/IB2012/000256, filed on Feb. 13, 2012, the disclosures of which are hereby incorporated herein in their entireties by reference.

FIELD

The present inventive concepts generally relate to the field of communications and, more particularly, to methods of communicating a command via short-range communications.

BACKGROUND

Short-range Radio Frequency (RF) wireless communications may include, for example, Bluetooth (e.g., Bluetooth 4.0) or ANT (e.g., ANT+) radio protocols. In other examples, short-range RF wireless communications may include Near Field Communications (NFC) or Radio Frequency Identification (RFID) protocols, among other examples (e.g., other examples of operating at frequencies that, in some countries, fall in an unlicensed ISM (industrial, scientific, medical) frequency range).

A short-range RF device (e.g., a Bluetooth, ANT, NFC, or RFID "tag") may be used to provide information (e.g., retail payment information) to a mobile phone. For example, a user of the mobile phone may initiate or finalize a communication session with a tag by bringing the mobile phone into close proximity with the tag. One example of such a communication may be communicating with a tag that is near a painting, to receive more information at the mobile phone about the artist of the painting.

SUMMARY

Various embodiments of the present inventive concepts include methods of operating a short-range Radio Frequency (RF) device. The methods may include transmitting identification information identifying the short-range RF device and/or sensor information, using a short-range RF communication protocol. The sensor information may be generated by a sensor associated with the short-range RF device. Also, the methods may include receiving a command, responsive to the identification information and/or the sensor information, from a server via a first device using the short-range RF communication protocol to control a second device associated with the short-range RF device.

According to various embodiments, transmitting the identification information and/or the sensor information may include transmitting encrypted sensor information and (e.g., in the same message with) encrypted identification information that identifies the short-range RF device. Transmitting the encrypted sensor information and/or the encrypted identification information may include transmitting the encrypted sensor information and/or the encrypted identification information at least twice before receiving the command from the server. Additionally or alternatively, the first device may include a first portable electronic device communicating with the short-range RF device using a first short-range RF communication link, and transmitting the encrypted identification information and/or the encrypted sensor information may include transmitting the encrypted identification information and/or the encrypted sensor information to a second portable electronic device using a second short-range RF communication link. In some embodiments, at least one of the first and second short-range RF communication links with the short-range RF device may be initiated and used independently of any user input at a respective one of the first and second portable electronic devices. Moreover, receiving the command may include receiving the command via the second portable electronic device (additionally or alternatively to receiving the command via the first portable electronic device).

In various embodiments, transmitting the encrypted sensor information and/or the encrypted identification information may include transmitting the encrypted sensor information and/or the encrypted identification information along with an unencrypted indication to at least one device to directly forward the encrypted sensor information and/or the encrypted identification information to the server or another server without buffering the encrypted sensor information and/or the encrypted identification information in the at least one device.

According to various embodiments, transmitting the encrypted sensor information and/or the encrypted identification information may include indiscriminately transmitting the encrypted sensor information and/or the encrypted identification information, using the short-range RF communication protocol, such that at least one anonymous adjacent portable electronic device will receive the identification information and/or the sensor information.

In various embodiments, the identification information and/or the sensor information may be destined for the server and/or another server. The command from the server may include identification information that identifies the short-range RF device and a control command to be executed by the second device. Moreover, the identification information from the server may include a plurality of identities (e.g., a plurality of randomized IDs) of the short-range RF device. Receiving the command from the server may include receiving a command identifier associated with the command, and the methods may include verifying, using the command identifier, that the command has not previously been received and/or executed since transmitting the identification information.

Short-range Radio Frequency (RF) devices according to various embodiments of the present inventive concepts may include a transmitter configured to transmit identification information that identifies the short-range RF devices and/or sensor information generated by a sensor associated with the short-range RF devices using a short-range RF communication protocol. The short-range RF devices may also include a receiver configured to receive a command, responsive to the identification information and/or the sensor information, from a server via a first device using the short-range RF communication protocol to control a second device associated with the short-range RF device.

In various embodiments, the transmitter may be configured to transmit encrypted sensor information and/or encrypted identification information that identifies the short-range RF device. The transmitter may be configured to indiscriminately broadcast the identification information and/or the sensor information using the short-range RF communication protocol such that at least one anonymous adjacent portable electronic device will receive the identification information and/or the sensor information. The first device may include a first portable electronic device configured to communicate with the short-range RF device using a first short-range RF communication link. The transmitter may be configured to transmit the encrypted identification information and/or the encrypted sensor information to a second portable electronic device configured to communicate with the short-range RF device using a second short-range RF communication link.

Methods of operating a server in a wireless communications network, according to various embodiments of the present inventive concepts, may include receiving identification information that identifies a short-range Radio Frequency (RF) device and/or sensor information generated by a sensor associated with the short-range RF device, from a relaying electronic device. The methods may also include transmitting a command, responsive to the identification information and/or the sensor information and destined for the short-range RF device, to the relaying electronic device and/or another relaying electronic device to control a device associated with the short-range RF device.

In various embodiments, receiving the identification information and/or the sensor information may include receiving encrypted sensor information and/or encrypted identification information that identifies the short-range RF device. Additionally or alternatively, transmitting the command may include transmitting the command to a plurality of relaying electronic devices.

According to various embodiments, determining that at least one relaying electronic device is likely to be near the short-range RF device, wherein transmitting the command may include transmitting, via a cellular network, the command to the at least one relaying electronic device determined as likely to be near the short-range RF device. In some embodiments, access to the cellular network may be limited or unavailable adjacent the short-range RF device, and the at least one relaying electronic device may be configured to receive the command via the cellular network and to relay the command to the short-range RF device using a short-range RF communication protocol.

Other methods and/or devices according to embodiments of the inventive concepts will be or become apparent to one with skill in the art upon review of the following drawings and detailed description. It is intended that all such additional devices and/or systems be included within this description, be within the scope of the present inventive concept, and be protected by the accompanying claims. Moreover, it is intended that all embodiments disclosed herein can be implemented separately or combined in any way and/or combination.

DETAILED DESCRIPTION OF EMBODIMENTS

Figure 1A:
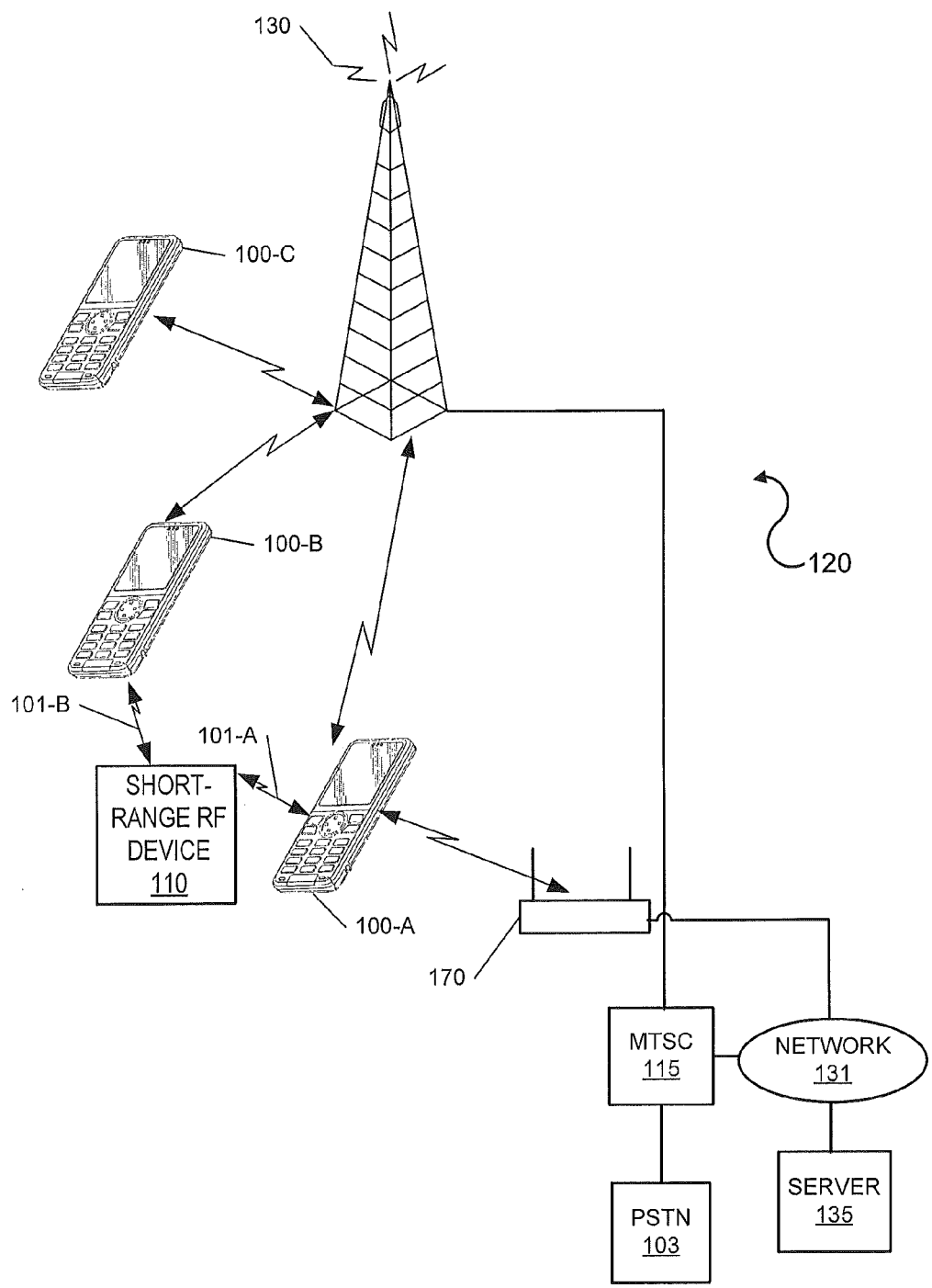
FIG. 1A is a schematic illustration of a wireless communications network that provides service to a portable electronic device, according to various embodiments of the present inventive concepts.

The present inventive concepts now will be described more fully with reference to the accompanying drawings, in which embodiments of the inventive concepts are shown. However, the present application should not be construed as limited to the embodiments set forth herein. Rather, these embodiments are provided so that this disclosure will be thorough and complete, and to fully convey the scope of the embodiments to those skilled in the art. Like reference numbers refer to like elements throughout.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein the term "and/or" includes any and all combinations of one or more of the associated listed items.

Spatially relative terms, such as "above", "below", "upper", "lower" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which these embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is to be understood that the functions/acts indicated in the illustrated blocks may occur out of the order noted in the operational illustrations. For example, two blocks shown in succession may in fact be executed substantially concurrently or the blocks may sometimes be executed in the reverse order, depending upon the functionality/acts involved.

Cloud computing is a computing paradigm where shared resources, such as processor(s), software, and information, are provided to computers and other devices on demand typically over a network, such as the Internet. In a cloud computing environment, details of the computing infrastructure, e.g., processing power, data storage, bandwidth, and/or other resources are abstracted from the user. Cloud computing systems may include servers, network storage devices, routers, gateways, communication links, and other devices. Because the physical hardware and software platforms on which cloud computing system is implemented are hidden within a "cloud," they can be managed, upgraded, replaced or otherwise changed by a system administrator without the user being aware of or affected by the change. The user, therefore, does not need to have any expertise in or control over such computing infrastructure resources. Cloud computing typically involves the provision of dynamically scalable and/or virtualized resources over the Internet. A user may access and use such resources through the use of a Web browser. A typical cloud computing provider may provide an online application that can be accessed over the Internet using a browser. The cloud computing provider, however, maintains the software for the application and some or all of the data associated with the application on servers in the cloud, i.e., servers that are maintained by the cloud computing provider rather than the users of the application.

Various embodiments of the operations and related devices described herein may provide control of devices that are associated with tags, through a wireless communications network. For example, in addition to transmitting sensor information and tag identities securely and anonymously through a wireless network, various embodiments described herein may use smart tags in an anonymous network of tag readers/writers to control devices associated with the smart tags, from a cloud/server. As an example, a tag may broadcast its identity to a cloud service through a tag reader network. The tags may be associated/combined with one or more sensors, and sensor information/data may be transmitted as a part of the identity broadcast message. Moreover, the cloud may send a control command back to the tag, to control a device associated with (e.g., attached to) the tag. In particular, tag readers/writers (e.g., mobile phones) may relay encrypted sensor data from the tag to the cloud service and/or may relay the control command from the cloud service to the tag.

Operations for registering and communications related to tagged objects are described in detail in International Application No. PCT/IB2011/000872, entitled "Methods, Systems and Computer Program Products for Registration of and Anonymous Communications Related to Tagged Objects," filed 20 Apr. 2011, the disclosure of which is hereby incorporated herein by reference.

Moreover, operations for anonymous tracking of objects are described in detail in International Application No. PCT/IB2011/000867, entitled "Methods, Systems and Computer Program Products for Anonymous Tracking of Objects," filed 20 Apr. 2011, the disclosure of which is hereby incorporated herein by reference.

Referring to FIG. 1A, a schematic illustration is provided of a wireless communications network 120 that provides service to portable electronic devices 100, according to various embodiments of the present inventive concepts. It will be understood that a portable electronic device 100 as described herein may refer to any one of the portable electronic devices 100-A, 100-B, 100-C, or another portable electronic device. The wireless communications network 120 may include a base station transceiver 130 (e.g., a cellular base station), a local wireless network transceiver 170 (e.g., WLAN or Bluetooth), a Mobile Telephone Switching Center (MTSC) 115, and/or a Public Service Telephone Network (PSTN) 103 (i.e., a "landline" network). As also shown in FIG. 1A, the MTSC 115 is coupled to a computer server 135 via a network 131, such as the Internet. The local wireless network transceiver 170 may also be connected to the network 131. Accordingly, a portable electronic device 100 may communicate with a short-range Radio Frequency (RF) device 110 using a short-range RF wireless communication link 101, and may communicate with the server 135 via the base station transceiver 130 (e.g., via cellular communications). Moreover, it will be understood that the short-range RF wireless communication links 101 may be used as bidirectional links or unidirectional links.

Figure 1B:
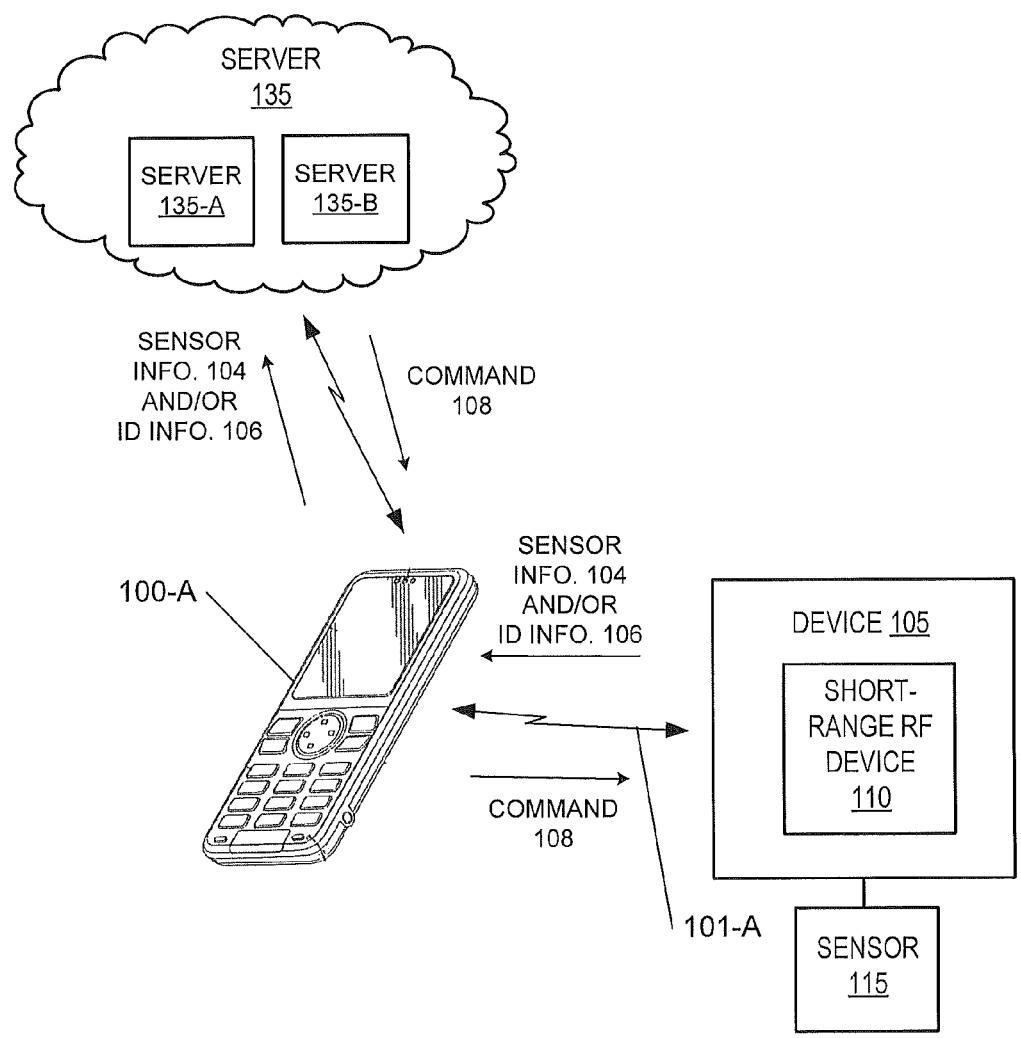
FIGS. 1B and 1C illustrate a portable electronic device and a short-range Radio Frequency (RF) device that communicate with each other through a short-range RF communication link, according to various embodiments of the present inventive concepts.

Referring now to FIG. 1B, an illustration is provided of a portable electronic device 100-A and a short-range RF device 110 that may communicate with each other through a short-range RF wireless communication link 101-A, according to various embodiments of the present inventive concepts. The short-range RF device 110 may transfer identification information 106 that identifies the short-range RF device 110 using a short-range RF communication protocol via the short-range RF wireless communication link 101-A. The short-range RF device 110 may optionally transfer sensor information 104, which may be generated by a sensor 115 associated with the short-range RF device 110. For example, the short-range RF device 110 may transfer the identification information 106 together with (e.g., in the same message with) the sensor information 104.

The identification information 106 can uniquely identify a tag (e.g., the short-range RF device 110) and, thus, any object associated with the tag, such as a sensor device (e.g., the sensor 115) and/or a device 105. For example, two different objects can have respective tags that each store different identification information that can be used to distinguish the two objects.

As illustrated in FIG. 1B, the short-range RF device 110 is associated with the device 105. For example, the short-range RF device 110 may be a Bluetooth tag, an ANT tag, or another tag (e.g., another smart tag) near or attached to the device 105. The sensor 115 may be attached to or near the device 105 and may obtain information about the device 105, such as the operational state of the device 105, and/or may collect environmental data, such as data regarding weather conditions or nearby people or objects, etc. It will be understood, however, that the types of information collected by the sensor 115 may include various categories of information. Moreover, it will be understood that the device 105 associated with the short-range RF device 110 and the sensor 115 may be one of various devices, such as a lock (e.g., a door lock), a thermostat, a vending machine, a digital display, a light (e.g., a light inside or outside of a home, a traffic light, or a street light), among many other examples.

Referring still to FIG. 1B, the portable electronic device 100-A may forward (e.g., relay) the sensor information 104 and/or the identification information 106 received from the short-range RF device 110 to the server 135. In particular, the portable electronic device 100-A may forward the sensor information 104 and/or the identification information 106 to the server 135 using cellular communications via the base station transceiver 130. The server 135 may transmit a command 108 to control the device 105 in response to the obtained sensor information 104 and/or the identification information 106. In particular, the server 135 may transmit the command 108 using cellular communications via the base station transceiver 130 to the portable electronic device 100-A, which may then forward the command 108 to the short-range RF device 110 via the short-range RF wireless communication link 101-A. The command 108 can be one of various types of control commands, such as a control command to switch on or off a heater, unlock a physical door lock, change a temperature setting, issue a can of soda to be submitted from a vending machine, activate extended sensing of the sensor 115, etc.

It will be understood that the server 135 (which may be referred to herein as "the cloud") may be a single server or may include a plurality of servers, such as servers 135-A and 135-B, or more servers. For example, the identification information 106 (and/or the sensor information 104) and the command 108 may be received by and sent from, respectively, the same server 135-A, or the identification information 106 (and/or the sensor information 104) may be received by the server 135-A and the command 108 may be sent by the server 135-B.

Moreover, it will be understood that although the identification information 106 (and/or the sensor information 104) and the command 108 are forwarded in FIG. 1B by the portable electronic device 100-A, the identification information 106 (and/or the sensor information 104) and the command 108 may additionally or alternatively be forwarded by a fixed electronic device, such as an electronic device that is fixed to or near the device 105. The fixed electronic device may communicate with the server 135 via wireless communications and/or via a wired connection such as a fixed Ethernet connection. For example, the fixed electronic device may be a fixed tag reader in a home and may use an Ethernet port to access a cloud service that provides home automation.

Furthermore, although the command 108 may be executed by the device 105 in various embodiments, the command 108 may alternatively be terminated in the short-range RF device 110. For example, the command 108 may include management data for the short-range RF device 110 (e.g., to upgrade firmware of the short-range RF device 110) or may include data to set up a user interface to a specific cloud service related to the device 105. Moreover, the command 108 may be terminated in a portable electronic device 100. For example, the command 108 may be used to set up a user interface (in the portable electronic device 100) that is dependent on Internet access. As an example, the command 108 may be used to set up a payment channel between the portable electronic device 100 and a merchant associated with a specific vending machine near the portable electronic device 100.

Figure 1C:
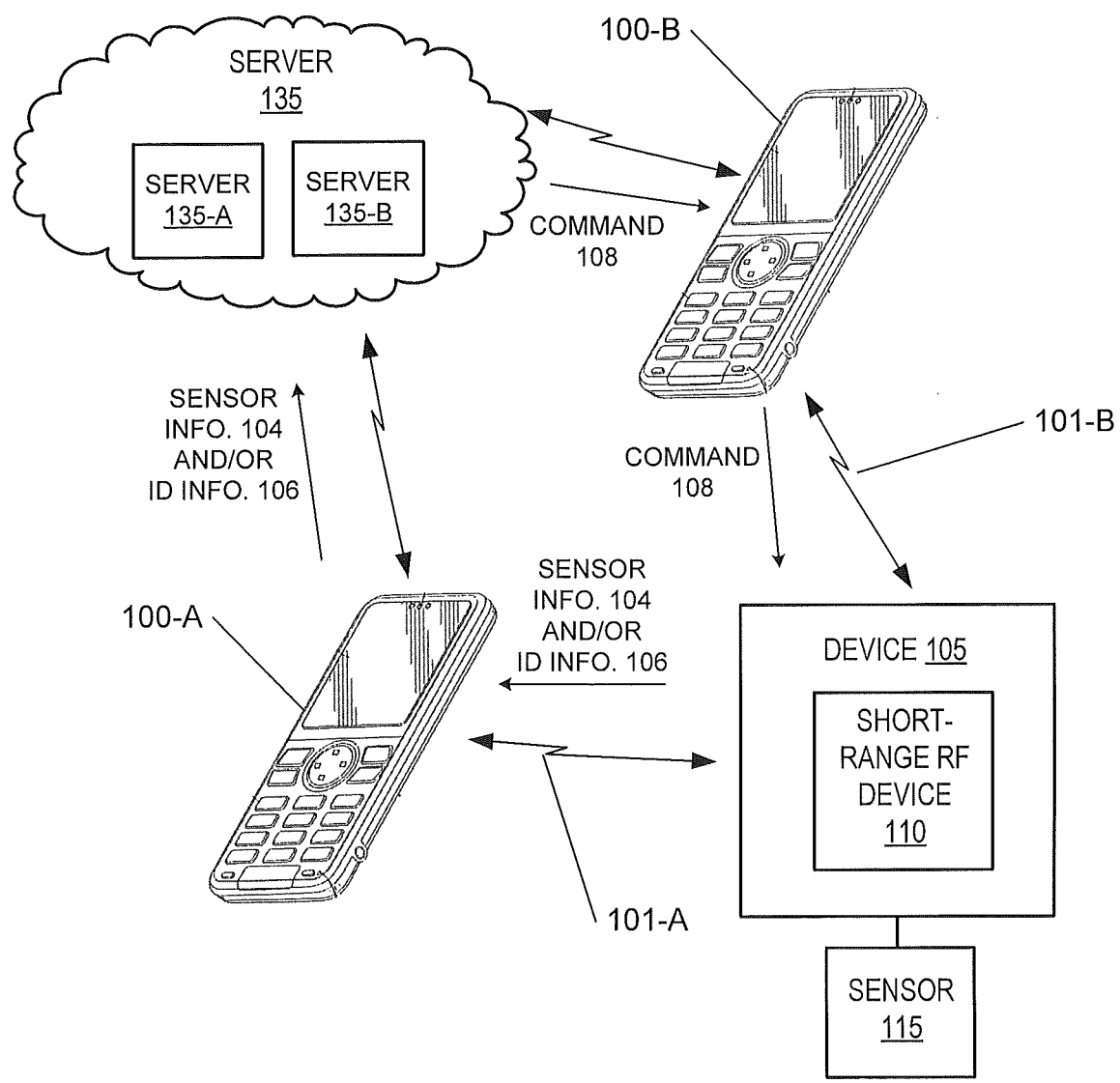

Referring now to FIG. 1C, the identification information 106 (and/or the sensor information 104) and the command 108 may be forwarded by different portable electronic devices 100-A and 100-B, respectively, according to various embodiments of the present inventive concepts. Accordingly, the device 105 may be controlled using a dynamic network of portable electronic devices 100 moving in and out of communications range with the base station transceiver 130 and/or the short-range RF device 110. In particular, as the portable electronic devices 100 illustrated in FIG. 1C are merely forwarding information rather than performing direct bidirectional communications with the short-range RF device 110, it may not matter whether the portable electronic device 100-A, the portable electronic device 100-B, or another one of the portable electronic devices 100 forwards the information, thus increasing the flexibility of the operations described herein. Moreover, it will be understood that although the portable electronic devices 100 are illustrated in FIG. 1C, the identification information 106 (and/or the sensor information 104) and/or the command 108 may additionally or alternatively be forwarded by one or more fixed electronic devices, such as an electronic device that is fixed to or near the device 105.

Figure 2A:
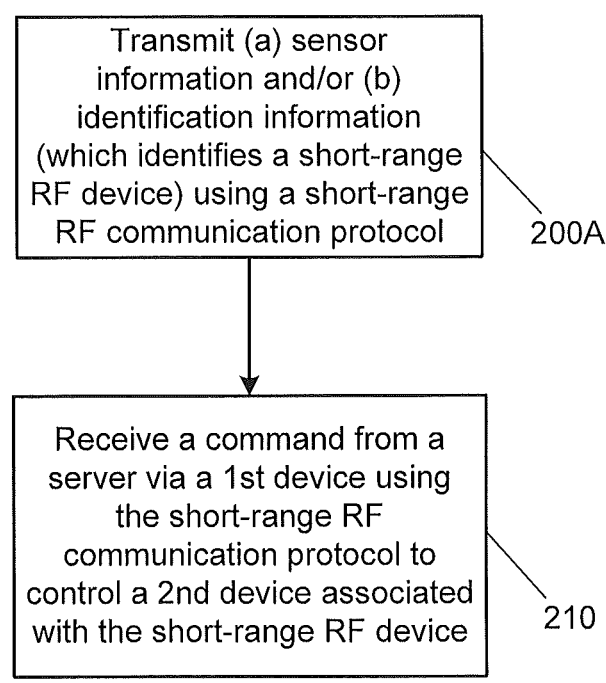
FIGS. 2A-2F are flowcharts illustrating operations of a short-range RF device, according to various embodiments of the present inventive concepts.

FIGS. 2A-2F are flowcharts illustrating operations of a short-range RF device 110, according to various embodiments of the present inventive concepts. Referring now to FIG. 2A, the short-range RF device 110 may transmit identification information 106 identifying the short-range RF device 110 and/or sensor information 104 generated by a sensor 115 associated with the short-range RF device 110, using a short-range RF communication protocol (Block 200A). For example, the short-range RF device 110 may transmit the identification information 106 (and/or the sensor information 104) via the short-range RF wireless communication link 101-A in FIGS. 1A-1C. Additionally, the short-range radio frequency device 110 may receive a command 108, which is responsive to the identification information 106 (and/or the sensor information 104), from a server 135 via a device (e.g., a portable electronic device 100 or a fixed electronic device) using the short-range RF communication protocol to control another device 105 associated with the short-range RF device 110 (Block 210).

Figure 2B:
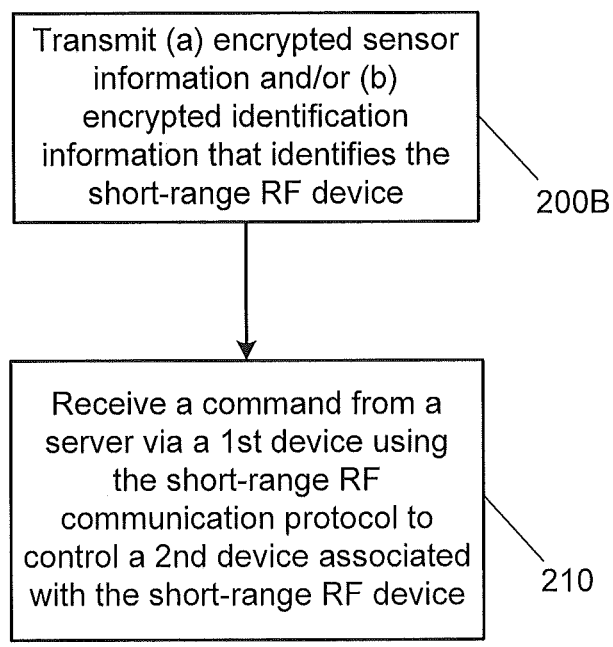
Figure 2C:
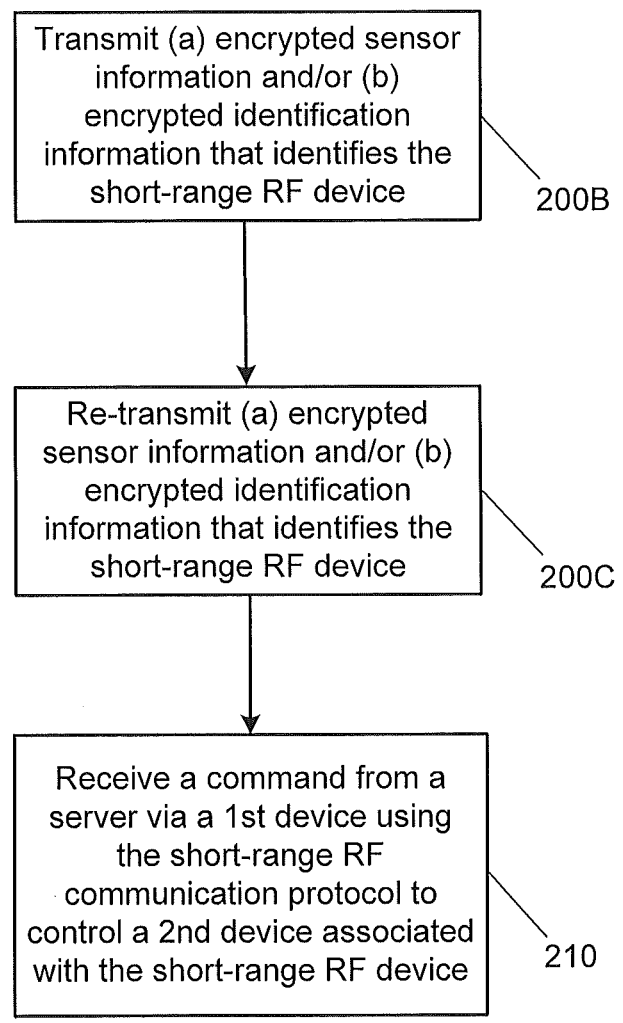

Referring now to FIG. 2B, transmitting the identification information 106 (and/or the sensor information 104) may include transmitting (a) encrypted sensor information 104 and/or (and optionally in the same message with) (b) encrypted identification information 106 that identifies the short-range RF device (Block 200B). Moreover, referring to FIG. 2C, the short-range RF device 110 may transmit (a) the encrypted sensor information 104 and/or (b) the encrypted identification information 106 at least twice (Blocks 200B and 200C) before receiving the command 108 from the server 135 (Block 210). Furthermore, it will be understood that although the short-range RF device 110 may receive the command 108 (Block 210) after transmitting the information at least twice (Blocks 200B and 200C), the short-range RF device 110 may receive the command 108 (Block 210) before the server 135 receives the information that is retransmitted (in Block 200C) because the portable electronic device 100 may be storing/buffering the command 108 after receiving it from the server 135 (responsive to the first transmission in Block 200B) and may forward the command 108 directly to the short-range RF device 110 in response to receiving the information that is retransmitted (in Block 200C).

For example, two transmissions from the short-range RF device 110 may be needed to receive the command 108 because the short-range RF device 110 may only listen for a command/response for a short period (e.g., a few milliseconds) after each transmission, and the portable electronic device 100 may not relay the command 108 until after the first short period. Alternatively, only one transmission from the short-range RF device 110 may be needed if the portable electronic device 100 can relay the command 108 to the short-range RF device 110 before the short-range RF device 110 stops listening.

In some embodiments, short-range RF device 110 may be continuously broadcasting the encrypted identification information 106 (and may repeatedly broadcast the encrypted sensor information 104). Additionally or alternatively, although the encrypted identification information 106 may be changed periodically (e.g., hourly), it may be assumed that the encrypted identification information 106 is consistent between at least a few consecutive broadcasts, which may provide a portable electronic device 100 that receives the encrypted identification information 106 sufficient time to receive a corresponding command 108 from the server 135 and to forward the command 108 (which is associated with one or more randomized IDs of the short-range RF device 110) to the short-range RF device 110. A portable electronic device 100 that forwards the encrypted sensor information 104 and the encrypted identification information 106 to the server 135 may also send to the server 135 an indication of the time and/or position (e.g., Global Positioning System (GPS) position) of when and/or where, respectively, the portable electronic device 100 received the encrypted sensor information 104 and the encrypted identification information 106 from the short-range RF device 110.

Figure 2D:
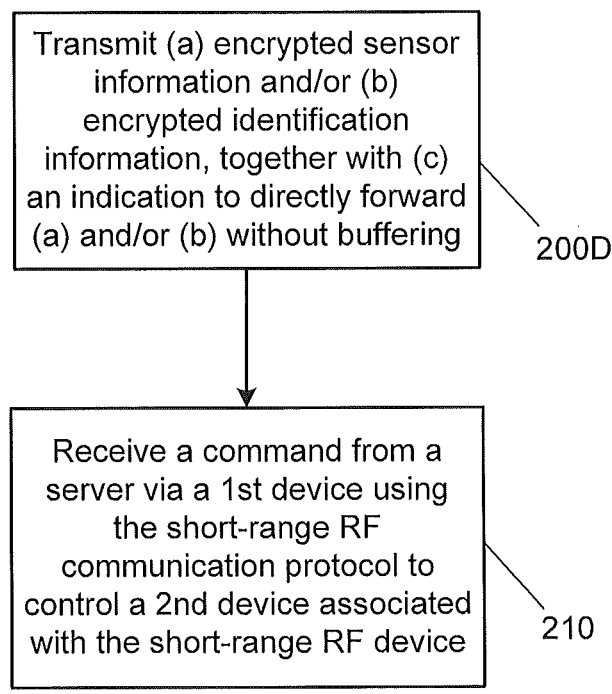

Referring to FIG. 2D, the short-range RF device 110 may transmit (a) the encrypted sensor information 104 and/or (b) the encrypted identification information 106 together with (c) an unencrypted indication (e.g., a flag) to at least one portable electronic device 100 or fixed electronic device to directly forward (a) the encrypted sensor information 104 and/or (b) the encrypted identification information 106 to the server 135 without buffering (a) the encrypted sensor information 104 and/or (b) the encrypted identification information 106 in the portable device(s) 100 or fixed device(s) (Block 200D).

Figure 2E:
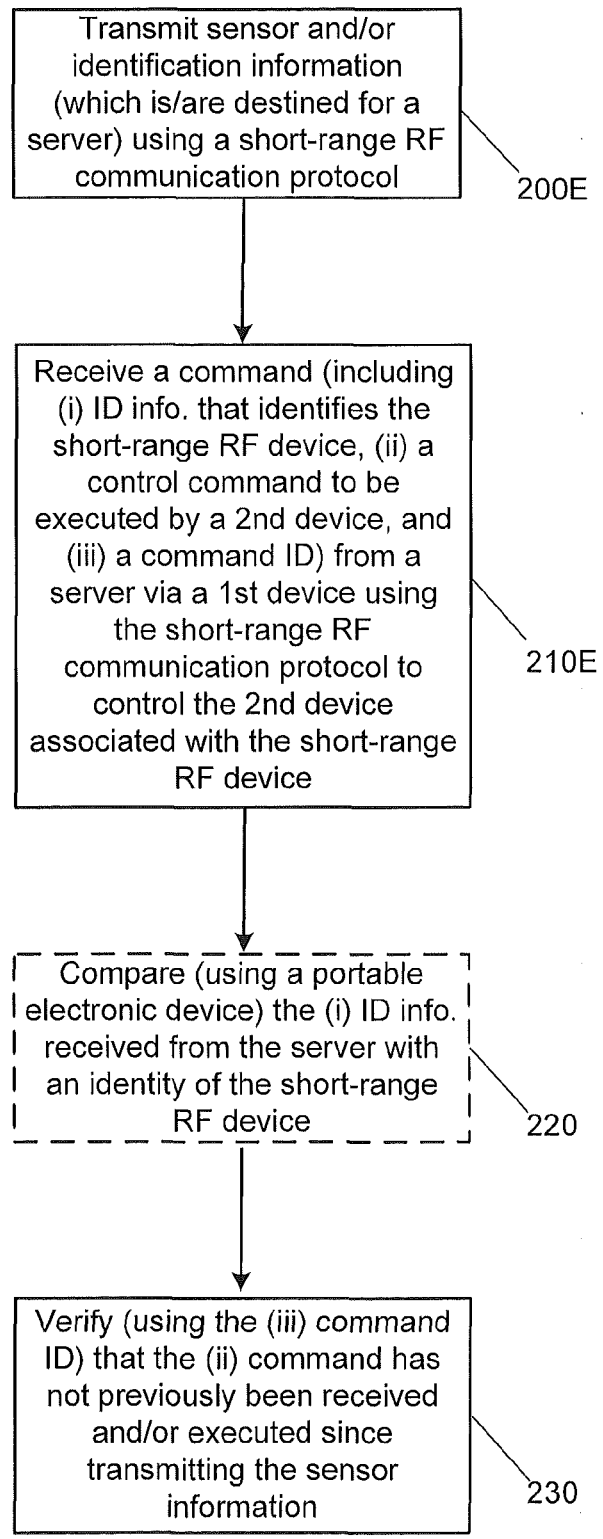

Referring to FIG. 2E, it will be understood that although the identification information 106 (and/or the sensor information 104) is initially transmitted from the short-range RF device 110 to the portable electronic device(s) 100 or fixed electronic device(s), the identification information 106 (and/or the sensor information 104) is ultimately destined for the server 135 (Block 200E). Moreover, the command 108 (e.g., a command message) received by the short-range RF device 110 may include (i) identification information (e.g., one or more randomized IDs) that identifies the short-range RF device 110, (ii) a control command to be executed by the device 105 and/or the short-range RF device 110, and (iii) a command identification (Block 210E). In some embodiments, the command 108 may be sent to the short-range RF device 110 from the server 135 and via the portable electronic device(s) 100 or fixed electronic device(s). Furthermore, the portable electronic device 100 may compare the identification information received from the server 135 with an identity of the short-range RF device 110 (Block 220). Accordingly, the portable electronic device 100 may determine/confirm that the command 108 is intended for that particular short-range RF device 110. In some embodiments, the short-range RF device 110 may verify, using the command identifier received from the server 135, that the command 108 has not previously been received and/or executed since the short-range RF device 110 transmitted the sensor information 104 (Block 230). The operations of Block 230 may thus protect against unnecessarily repeating execution of the command 108.

Figure 2F:
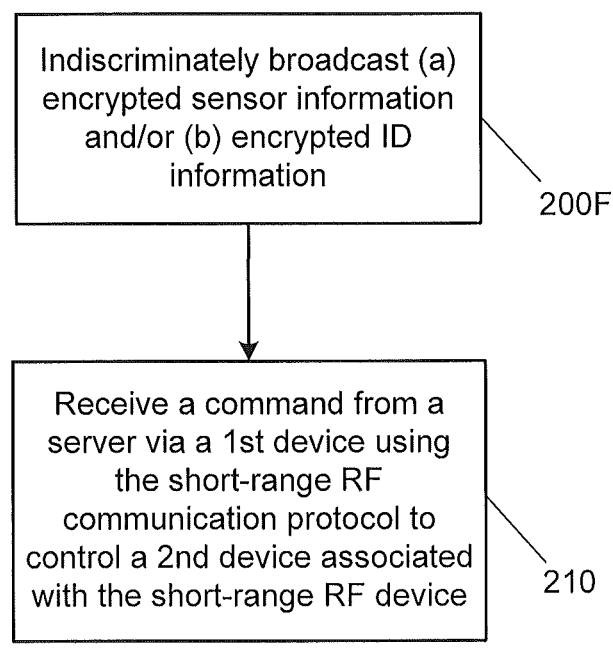

Referring now to FIG. 2F, the short-range RF device 110 may indiscriminately broadcast the encrypted sensor information 104 and/or the encrypted identification information 106, using the short-range RF communication protocol, such that at least one anonymous (to the short-range RF device 110) adjacent portable electronic device 100 will receive the identification information 106 and/or the sensor information 104. In other words, rather than selecting a particular portable electronic device 100 to receive the identification information 106 and/or the sensor information 104, the short-range RF device 110 may broadcast the identification information 106 and/or the sensor information 104 such that a plurality of portable electronic devices 100 may receive the identification information 106 and/or the sensor information 104, even if the short-range RF device 110 is unaware of the particular ones of the portable electronic devices 100. Moreover, the identification information 106 and/or the sensor information 104 may be encrypted such that the portable electronic devices 100 cannot read/understand the content of the identification information 106 and/or the sensor information 104, but will forward the encrypted sensor information 104 and/or the encrypted identification information 106 to the server 135. Additionally, referring to FIGS. 1C and 2F, it will be understood that at least one of the short-range RF communication links 101-A and 101-B with the short-range RF 110 device may be initiated and used independently of any user input at the portable electronic devices 100-A and 100-B. In other words, the portable electronic devices 100 may receive the identification information 106 (and/or the sensor information 104) and/or the command 108 automatically and without a user request at these portable electronic devices 100.

It will be understood that the short-range RF device 110 may be anonymous to one or more of the portable electronic devices 100, and/or that one or more of the portable electronic devices 100 may be anonymous to the short-range RF device 110. For example, the short-range RF device 110 may be anonymous to the portable electronic devices 100, in that the portable electronic devices 100 may be unable to track/identify the short-range RF device 110 using information (e.g., the encrypted sensor information 104 and/or the encrypted identification information 106) transmitted by the short-range RF device 110. Although the portable electronic devices 100 may or may not be anonymous to the server 135 (e.g., may or may not be tracked/identified by the server 135), it will be understood that some (or even most) of the portable electronic devices 100 may be logged-in (and thus not anonymous) to a service provided by the server 135, which may improve the efficiency/effectiveness of communications (e.g., communications including the command 108) from the server 135 to the portable electronic devices 100.

Figure 3A:
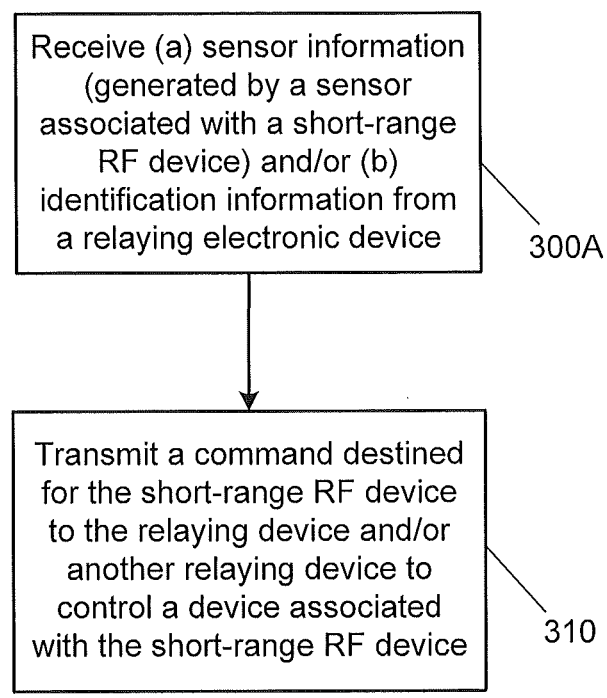
FIGS. 3A-3D are flowcharts illustrating operations of a server in a wireless communications network, according to various embodiments of the present inventive concepts.
Figure 3B:
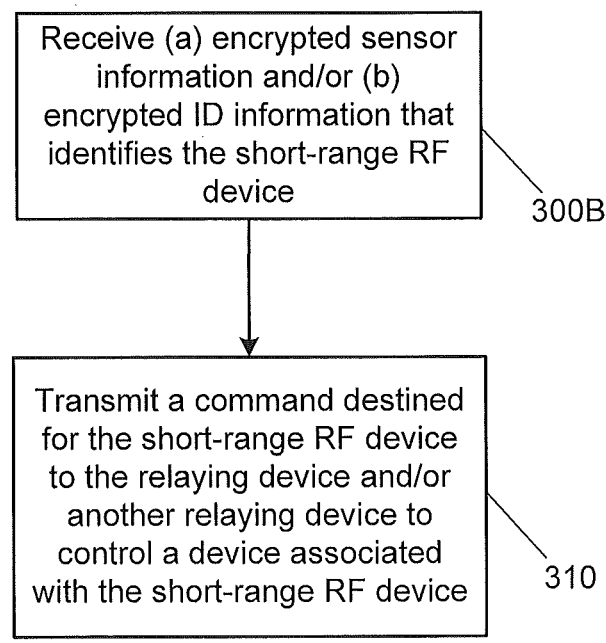

FIGS. 3A-3D are flowcharts illustrating operations of a server 135 in a wireless communications network 120, according to various embodiments of the present inventive concepts. Referring the FIG. 3A, the server 135 may receive identification information 106 identifying the short-range RF device 110 and/or sensor information 104 generated by a sensor 115 associated with a short-range RF device 110, from a relaying (e.g., forwarding) electronic device (Block 300A). The relaying electronic device may be a portable electronic device 100 or a fixed electronic device. The server 135 may also transmit a command 108, which is responsive to the identification information 106 (and/or the sensor information 104) and is destined for the short-range RF device 110, to the relaying electronic device 100 and/or another relaying electronic device 100 to control a device 105 associated with the short-range RF device 110 (Block 310). Referring now to FIG. 3B, in some embodiments, the server 135 may receive encrypted sensor information 104 and/or encrypted identification information 106 that identifies the short-range RF device 110 (Block 300B).

Figure 3C:
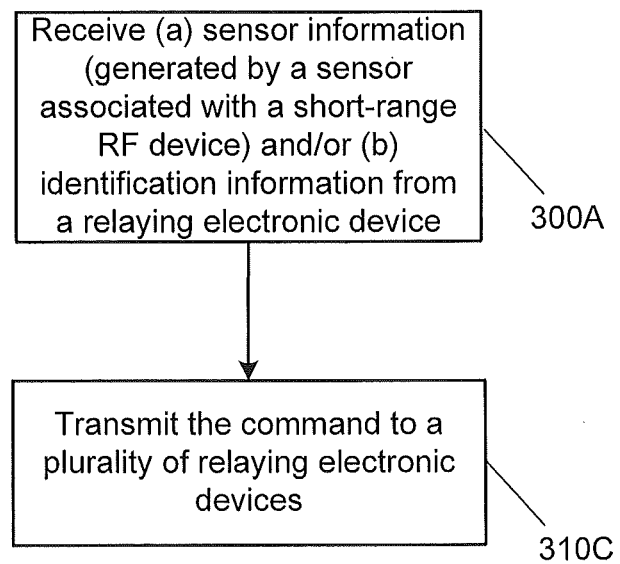

Referring to FIG. 3C, the server 135 may transmit the command 108 to a plurality of relaying electronic devices (Block 310C). For example, the server 135 may transmit the command 108 to a plurality of portable electronic devices 100 because the server 135 may not know (e.g., if the short-range RF device 110 is in an area with limited/no cellular communications connectivity) exactly which one(s) of the plurality of portable electronic devices 100 may ultimately be within short-range RF communications range of the short-range RF device 110 and be able to successfully relay the command 108 to the short-range RF device 110.

The command 108 can be added to and stored in the cloud in numerous ways. Among other examples, the command 108 can be created/added by the owner of the device 105 through an Internet application, it can be automatically created in response to another sensor event registered by the server 135, it can be triggered by a user interface on a device, and it can be triggered by an external system such as a service owned by a financial institution.

Figure 3D:
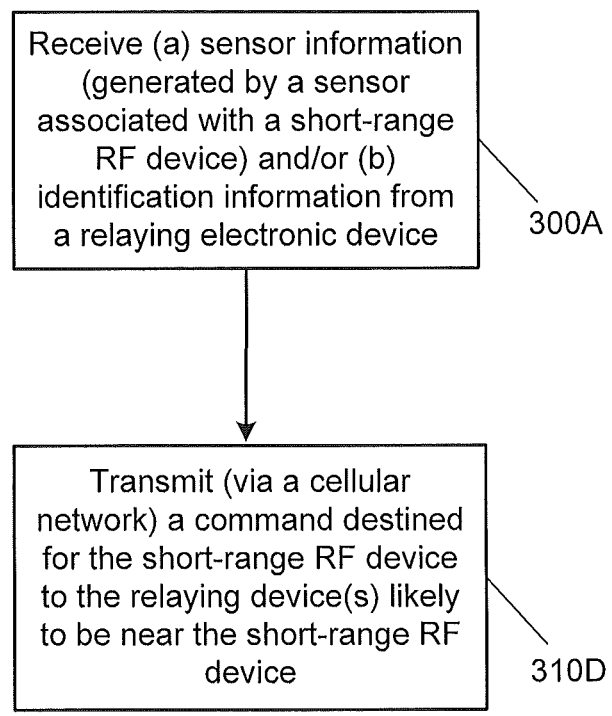

Referring to FIG. 3D, the server 135 may transmit the command 108 to a plurality of portable electronic devices 100 that are likely to be near the short-range RF device 110 (Block 310D). Moreover, it will be understood that the communications described herein between the server 135 and the portable electronic devices 100 may be cellular communications, whereas the communications between the portable electronic devices 100 (or fixed relaying electronic devices) and the short-range RF device 110 may be non-cellular short-range RF communications. Accordingly, if access to a cellular network (e.g., via the base station transceiver 130) is limited or unavailable adjacent the short-range RF device 110, the command 108 may still reach the short-range RF device 110 if the server 135 can transmit the command 108 via cellular communications to at least one portable electronic device 100 that can subsequently (even after losing some or all cellular connectivity) forward the command 108 to the short-range RF device 110 via non-cellular short-range RF communications.

In other words, one way to reach the short-range RF device 110 from the server 135 is to optimistically send the command 108 to one or more portable electronic devices 100 likely to communicate with the short-range RF device 110. The set of portable electronic devices 100 to which the command 108 is sent may be based on a history of receiving broadcasts from or sending commands to the short-range RF device 110, the current time of day and/or the current location of one or more of the portable electronic devices 100, tag identifications that the portable electronic devices 100 have recently reported, etc. By optimistically sending the command 108 from the server 135 before one or more portable electronic devices 100 have reached the short-range RF communications range of (or before the portable electronic device(s) 100 otherwise move(s) closer to) the short-range RF device 110, the likelihood of successfully sending the command 108 from the server to the short-range RF device 110 may significantly improve. For example, the improvement may be significant in an area with limited or no Wide Area Network (WAN) access, or if the speed of passing portable electronic devices 100 is too high for a portable electronic device 100 to both receive and relay the command 108 before leaving the short-range RF communications range of the short-range RF device 110.

Moreover, it will be understood that a portable electronic device 100 that receives the command 108 from the server 135 before the portable electronic device 100 reaches the short-range RF communications range of the short-range RF device 110 may store/buffer the command 108 until the portable electronic device 100 relays the command 108 to the short-range RF device 110. For example, the server 135 may specify a minimum time that the command 108 should be stored before it is deleted by the portable electronic device 100. As an example, where a command 108 is destined for a short-range RF device 110 in a highway tunnel (with limited/no cellular network access), the server 135 may have a good estimate on when the short-range RF device 110 will be reached (e.g., when the portable electronic device 100 will be closer to the short-range RF device 110). Furthermore, as a randomized ID that identifies the short-range RF device 110 may be invalid (due to the short-range RF device 110 changing its ID) by the time the portable electronic device 100 reaches the short-range RF device 110, the server 135 may provide a plurality of randomized IDs (including future IDs) of the short-range RF device 110 to the portable electronic device 100, such that the identification of the short-range RF device 110 is valid for an extended period of time.

Figure 4:
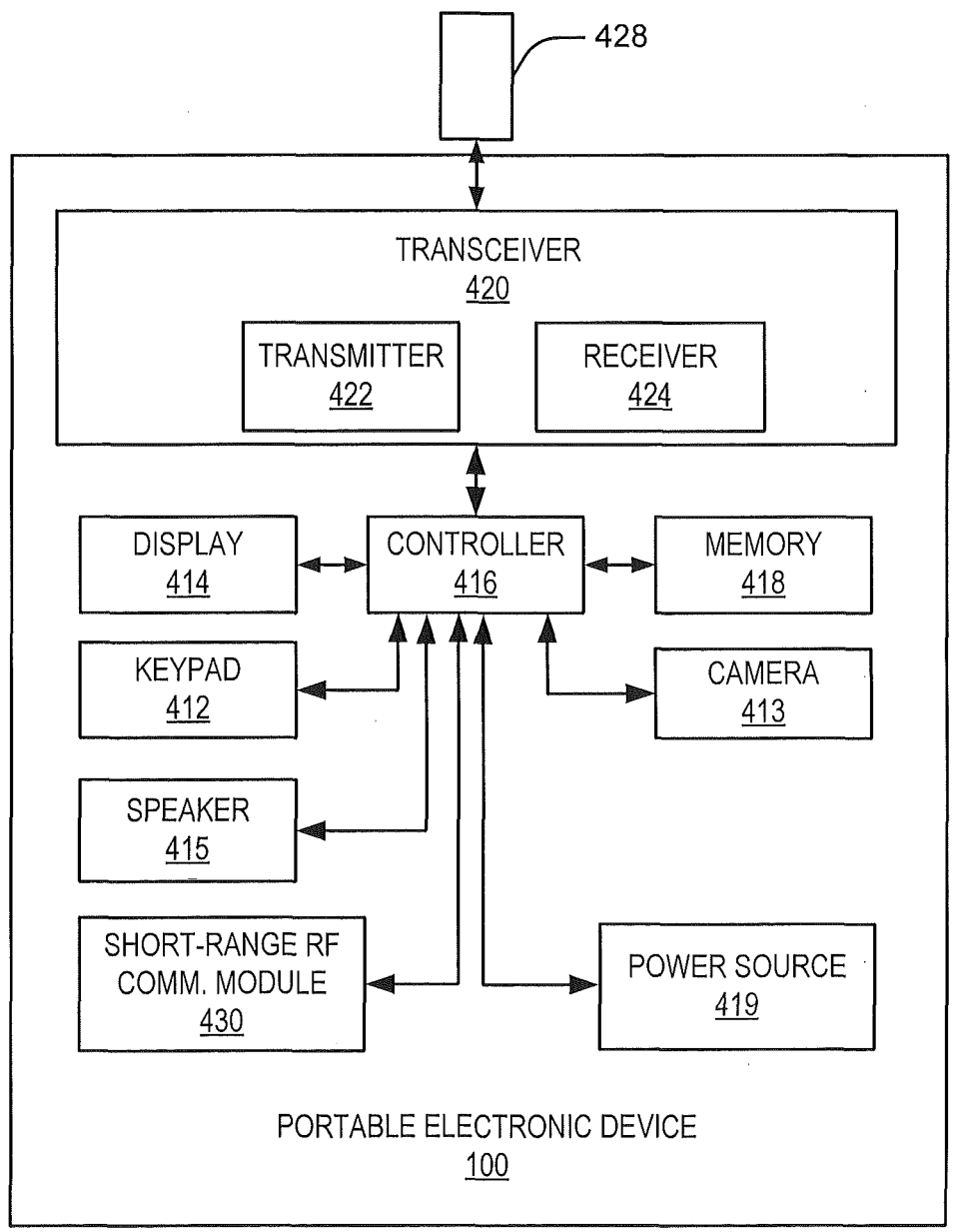
FIG. 4 is a block diagram illustrating a portable electronic device, according to various embodiments of the present inventive concepts.

Referring now to FIG. 4, a block diagram is provided illustrating a portable electronic device 100, according to various embodiments of the present inventive concepts. The portable electronic device 100 may be any of a variety of portable electronic devices. For example, the portable electronic device 100 may be a mobile terminal (e.g., a mobile telephone), a portable audio player, a portable video player, a camera, an electronic reading device, or a portable computer (e.g., a tablet computer, a netbook computer, or a laptop computer). It will be understood, however, that a fixed electronic device configured to perform the operations described herein may also include the features of FIG. 4. Moreover, in some embodiments, a portable electronic device 100 or a fixed electronic device may be referred to as a "relaying electronic device" or a "tag reader/writer/detector."

As illustrated in FIG. 4, the portable electronic device 100 may include a keypad 412, a display 414, a transceiver 420, a memory 418, a power source 419, a speaker 415, and a camera 413 that communicate with a controller 416. The controller 416 may include any low-power microprocessor and/or microcontroller used for portable electronic device applications. The controller 416 can include a signal processor. Additionally, or alternatively, a signal processor can be provided as a separate component of the portable electronic device 100.

The transceiver 420 may include a transmitter circuit 422 and a receiver circuit 424, which may cooperate to transmit and receive RF signals via an antenna 428. Although FIG. 4 illustrates that a portion of the antenna 428 extends beyond the housing of the portable electronic device 100, in various embodiments, the antenna 428 may not be visible to a user of the portable electronic device 100 and/or may not protrude from the housing of the portable electronic device 100. According to various embodiments, the transceiver 420 of the portable electronic device 100 may be configured to operate in any of the following bands: Advanced Mobile Phone Service (AMPS), ANSI-136, Global System for Mobile Communications (GSM), Third Generation Partnership Project (3GPP) Long Term Evolution (LTE), General Packet Radio Service (GPRS), enhanced data rates for GSM evolution (EDGE), Digital Communications Services (DCS), Personal Digital Cellular (PDC), Personal Communications Services (PCS), Code Division Multiple Access (CDMA), wideband-CDMA, CDMA2000, and/or Universal Mobile Telecommunications System (UMTS) frequency bands. Other bands can also be used in embodiments according to the inventive concepts. Also, various embodiments may be compatible with Long Term Evolution (LTE) and/or High Speed Packet Access (HSPA) standards. Additionally or alternatively, in some embodiments, the portable electronic device 100 may be configured to use Global Positioning System (GPS) and/or Wireless Local Area Network (WLAN) frequency bands.

The memory 418 may be a general purpose memory that is used to store both program instructions for the controller 416, as well as data, such as audio data, video data, configuration data, and/or other data that may be accessed and/or used by the controller 416. The memory 418 may include a nonvolatile read/write memory, a read-only memory, and/or a volatile read/write memory. In particular, the memory 418 may include a read-only memory in which basic operating system instructions are stored, a non-volatile read/write memory in which re-usable data, such as configuration information, directory information, and other information may be stored, as well as a volatile read/write memory, in which short-term instructions and/or temporary data may be stored. In various embodiments, the memory 418 may include a removable nonvolatile memory card.

The portable electronic device 100 further includes a short-range RF communication module 430 that may be configured to operate in one or more modes to forward information to and/or from the short-range RF device 110. The short-range RF communication module 430 is operatively coupled to the controller 416 and can operate under the control of the controller 416. The short-range RF communication module 430 is configured to receive the identification information 106 (e.g., a tag identification) using a short-range wireless transmission protocol even when the portable electronic device 100 does not have any knowledge of the source of the received tag identification. The portable electronic device 100 may transmit the tag identification over a wide area cellular network communicatively coupled to the portable electronic device 100, such as through the base station transceiver 130. As the portable electronic device 100 need not have any knowledge of the source of the received tag identification, substantially all users may relay information for all tags that are in proximity to the tag readers (e.g., portable electronic devices 100) to support the operations described herein. This collection and transmitting may be done automatically (e.g., in the background) so that it should not affect the usability of the portable electronic device 100 for the user of the portable electronic device 100.

As will be further described herein, this may be done anonymously to limit or prevent any integrity issues related to collecting information for tags that the user does not own (or are not owned by someone who has established the user as authorized to act for the owner). The only entity that need know the tags' real identity (and owner) may be an Internet cloud based server computer hosting a service. The service may only permit information for the object to be communicated to the object's owner and secondary users permitted by the owner of the tag.

According to various embodiments, the portable electronic device 100 and the short-range RF device 110 may be different types of devices. For example, the portable electronic device 100 may be a battery-powered device (e.g., the power source 419 may include a battery), and the short-range RF device 110 may not be battery-powered, but rather may receive power from an external source (e.g., from signals transmitted by the portable electronic device 100). Accordingly, the power source 419 of the portable electronic device 100 may power the short-range RF device 110 through magnetic coupling. Additionally or alternatively, the portable electronic device 100 may include a display device (e.g., the display 414) and/or a keypad (e.g., the keypad 412), whereas the short-range RF device 110 may not have a display and/or a keypad.

Figure 5A:
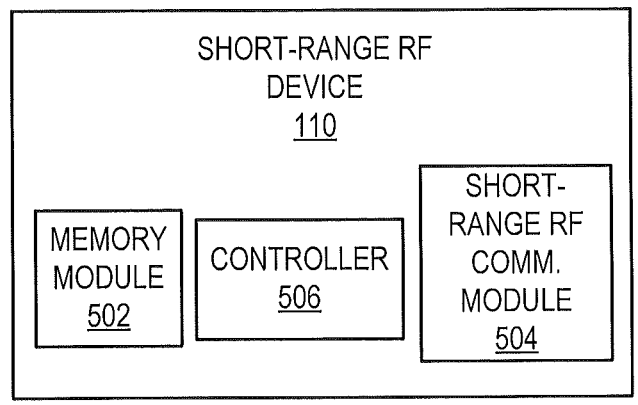
FIGS. 5A-5D are block diagrams illustrating the short-range RF device, according to various embodiments of the present inventive concepts.

FIGS. 5A-5D are block diagrams illustrating a short-range RF device 110, according to various embodiments of the present inventive concepts. As illustrated in FIG. 5A, the short-range RF device 110 may include a short-range RF communication module 504. The short-range RF communication module 504 may be configured to communicate with a portable electronic device 100 through a short-range RF communication link 101, as illustrated in FIGS. 1A-C. Additionally, the short-range RF device 110 may include a memory module 502 and a controller 506.

Figure 5B:
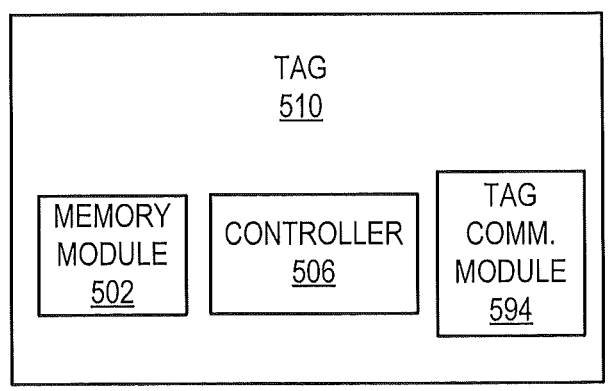

As illustrated in FIG. 5B, the short-range RF communication module 504 may include an tag communication module 594 in various embodiments. Accordingly, the short-range RF device 110 may be a tag 510 (e.g., a Bluetooth tag, an ANT tag, a WLAN tag, an NFC tag, and RFID tag, or another smart tag). According to some embodiments, the tag communication module 594 may be configured to operate in a passive mode. In other words, the tag communication module 594 may not have a separate power source, and may therefore operate using power derived from signals transmitted by the portable electronic devices 100.

Figure 5C:
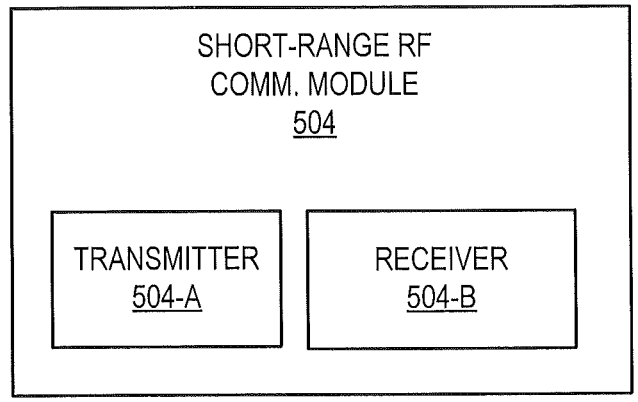
Figure 5D:
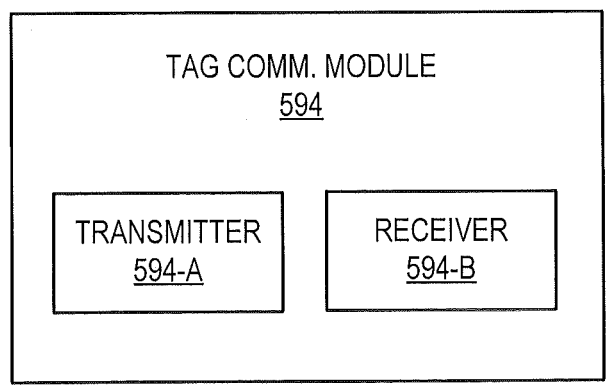

Referring now to FIGS. 5C and 5D, the short-range RF communication module 504 and the tag communication module 594 may include a transmitter 504-A/594-A and a receiver 504-B/594-B configured to provide the short-range RF communications described herein.

Figure 6:
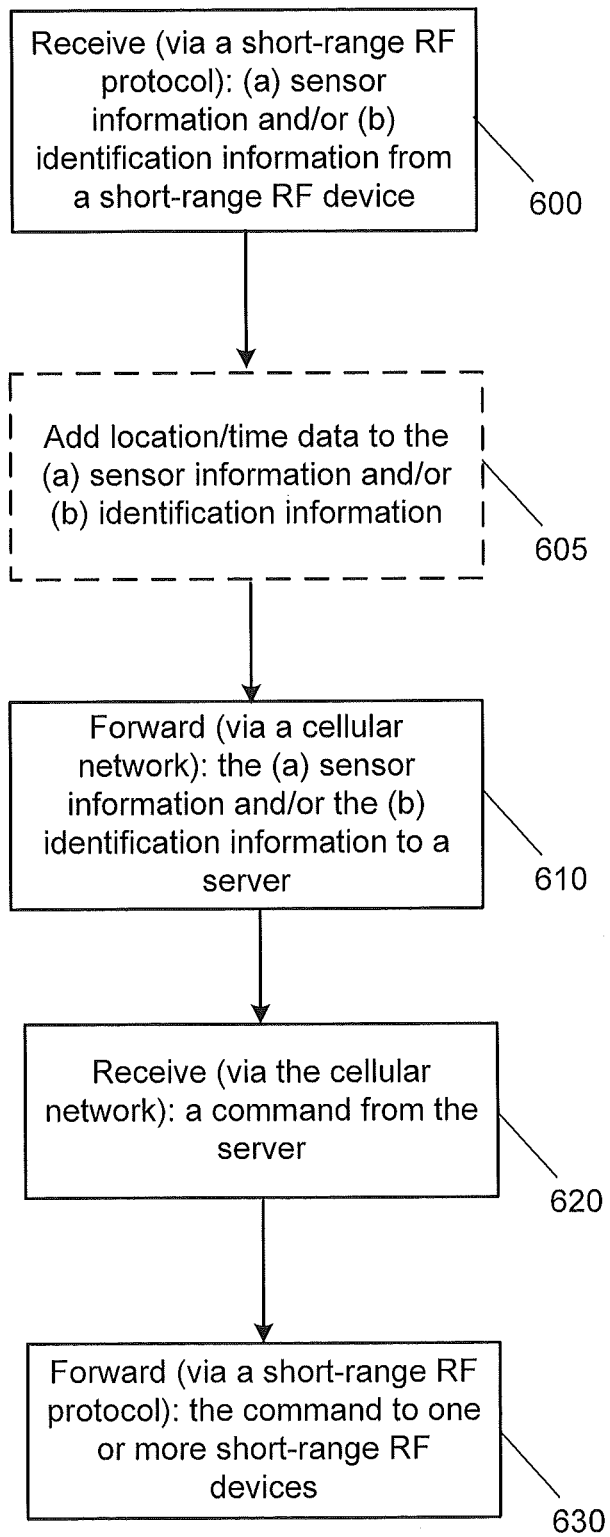
FIG. 6 is a flowchart illustrating operations of portable electronic devices in a wireless communications network, according to various embodiments of the present inventive concepts.

Referring now to FIG. 6, a flowchart is provided illustrating operations of portable electronic devices 100, according to various embodiments of the present inventive, concepts. One or more of the portable electronic devices 100 may receive identification information 106, which identifies the short-range RF device 110, from the short-range RF device 110 via a short-range RF communication protocol (Block 600). For example, all portable electronic devices 100 in the vicinity of the short-range RF device 110 may receive the identification information 106 from the short-range RF device 110. In other words, the portable electronic device 100-A may receive the same identification information 106 (and/or sensor information 104) transmitted to/received by at least one other portable electronic device 100 (e.g., the portable electronic device 100-B and/or the portable electronic device 100-C). Alternatively, in some embodiments, only one of the portable electronic devices 100 may receive the identification information 106. The portable electronic device(s) 100 may optionally receive the sensor information 104 in addition to the identification information 106.

The portable electronic device(s) 100 may add location (e.g., GPS) and/or time data to the received identification information 106 and/or sensor information 104 (Block 605). For example, location and time data may affect the server 135's decision to return the control command 108. The portable electronic device(s) 100 may forward the received identification information 106 and/or sensor information 104 (which may be included/associated with added location and/or time data) to the server 135 via a cellular network (Block 610). The portable electronic device(s) 100 may then receive the command 108 from the server 135 via the cellular network, which command 108 the server 135 transmits in response to receiving the identification information 106 and/or sensor information 104 from the portable electronic device(s) 100 (Block 620). Moreover, it will be understood that the same portable electronic device 100 (e.g., the portable electronic device 100-A, as illustrated in FIG. 1B) and/or different respective portable electronic devices 100 (e.g., the portable electronic devices 100-A and 100-B, as illustrated in FIG. 1C) may perform the operations in Blocks 610 and 620. Furthermore, a plurality of the portable electronic devices 100 may perform one or both of the operations in Blocks 610 and 620.

The portable electronic device(s) 100 may forward the command 108 to at least one short-range RF device 110 via a short-range RF communication protocol (Block 630). The short-range RF device 110 receiving the command 108 may be the same device that transmitted the identification information 106 and/or sensor information 104 to the portable electronic device(s) 100, or may be a different device (or a plurality of different devices). For example, the short-range RF device 110 that transmitted the identification information 106 and/or sensor information 104 may be associated with a temperature sensor, and the portable electronic device(s) 100 may forward the command 108 to two short-range RF devices 110 that control respective heating elements. Moreover, it will be understood that the command 108 may be associated with at least one randomized ID corresponding to a particular short-range RF device 110. The randomized ID(s) may inform the portable electronic device(s) 100 to forward the command 108 to the particular short-range RF device 110 (or to a plurality of particular short-range RF devices 110). Moreover, the server 135 may sometimes optimistically/indiscriminately transmit the command 108 to portable electronic device(s) 100 (and, ultimately, a short-range RF device 110) that may not have reported information (e.g., sensor information 104 or identification information 106) to the server 135.

Referring still to FIG. 6, as described herein, it will be understood that the sensor information 104 and/or the identification information 106 may be encrypted. Moreover, it will be understood that the portable electronic device(s) 100 may receive (e.g., in Block 600) an indication from the short-range RF device 110 to forward the sensor information 104 and/or the identification information 106 to the server 135 without buffering, thus increasing the speed of the operations described herein. Furthermore, it will be understood that the portable electronic device(s) 100 may perform the operations of Block 220 (regarding comparing identification information of a short-range RF device 110 transmitted by the server 135) of FIG. 2E. For example, the portable electronic device(s) 100 may perform the operations of Block 220 of FIG. 2E between performing the operations of Blocks 620 and 630 of FIG. 6.

The following examples are provided to further illustrate the inventive concepts described herein. It will be understood, however, that the present inventive concepts may be embodied in various forms and are not limited by the following examples.

Example 1—Cloud-Controlled Vending Machine

A vending machine product may be selected and paid for through a mobile application in a mobile phone. In particular, a vending machine may be equipped with a tag that can broadcast sensor information from the vending machine and receive control commands from tag readers. The first step is to identify the person that wants to buy the product and set up a buying connection with the merchant. This may done by starting a specific payment application in the phone and pressing an activation button on the vending machine. As a result of the button press, an identification (ID) broadcast is sent from the vending machine tag for a certain period of time. When a tag reader reports this to the cloud, it will reply with the following:

1. A tag-reader-terminated action to setup a payment channel to the merchant related to the specific vending machine. This information may include a Uniform Resource Locator (URL) to the merchant, and a unique identifier for the vending machine. The tag reader may be unknown/anonymous to the cloud and the customer. Customer identification and payment may be handled between the merchant and the customer, whereas various embodiments described herein may provide for identification of the vending machine, product identification, and product output.
2. A tag-terminated action to allow the vending machine to change mode to an active customer session.

The reply is pre-recorded in the cloud by the merchant at a previous time.

All tag readers that are reporting the ID broadcast from the vending machine will get the same reply from the cloud. For users with the payment application opened, the user will be presented with the option to connect to the merchant (as a result of the cloud reply 1 above). For other users, the tag-reader-terminated action may be ignored. It will be understood, however, that the same payment application can be used for different merchants. Moreover, it will be understood that if multiple users try to connect to the merchant targeting the same vending machine, the first customer will be served.

The tag-terminated action is supplied to the tag (by any tag reader). To save tag reader power, tag readers may not report all ID messages from the same tag if the broadcast message is identical and/or the location has not changed. A special flag "DIRECT_UPLOAD" (open and readable by tag readers) is used to indicate that the specific broadcast shall be uploaded directly to the cloud. The resulting mode change (to "active customer" mode) in the vending machine will allow the vending machine to set the DIRECT_UPLOAD flag to allow all or some of the ID broadcasts to be sent directly from the tag reader to the cloud for a certain time period (i.e., to disable/override buffering in the tag reader). In other words, a tag reader receiving the flag will not buffer the ID/sensor information received from the tag before sending (i.e., relaying/uploading) the information to the cloud, thus improving the speed of the operations described herein. This is an effective strategy because, for example, a fast vending machine action to output the product is expected when the customer-merchant session is over. The tag reader that knows about the merchant session can also prioritize broadcasts from the specific vending machine and send them without delay to the cloud during the ongoing session.

Additionally or alternatively, the cloud (rather than the tag) may command nearby tag readers to disable buffering for the tag identified by the current randomized ID. The cloud command can be issued as a response to tag readers reporting broadcasts for the specific tag. The cloud could also determine which tag readers to send this command to based on the tag readers' locations. In this case, any broadcast uploaded (e.g., from other tags) with a nearby location (e.g., determined by Global Positioning System (GPS)) could trigger the cloud command back to the tag reader.

When connected to the merchant, the user can select the product to purchase (assuming that the merchant has an updated inventory) and perform the payment using existing technologies. When the merchant has identified the product and verified the payment, a new control message to output the product from the vending machine is issued through the cloud service. Any nearby tag reader can be used to relay this control message to the vending machine.

There are alternative ways to set up the connection between the customer and the merchant. Instead of using an action button on the vending machine, it may (e.g., via the tag) continuously broadcast ID broadcasts. Different vending machines may be ordered by signal strength (i.e., in distance order) and may also be associated with a unique identifier to enable the customer to pick the right one. Another alternative is to use a specific NFC tag on the machine in combination with a payment application in the phone. In this case, the explicit touch to the machine's NFC tag instead of the explicit selection of a vending machine in the phone application is used to make the connection. In other aspects, the solution is quite similar. Both would, in practice, use a cloud service to feed the actual merchant information based on the NFC or smart tag's ID. Independently of the way the customer-merchant connection is set up, smart tags can still be used to update vending machine status (e.g., inventory, etc.) and to control what product should be output from the machine.

Example 2—Disable Stolen or Misplaced Items

GPS and WAN technologies provide methods for locating items, including items that may be stolen. To protect tagged items further from theft, items could be automatically disabled in the event of theft. For instance, a smart-tag-equipped laptop could have a hardware lock enabled if the laptop is stolen. The lock may be software-based or may be part of the firmware to make the laptop unusable even if it is reconfigured. The contents of the persistent memory could also be erased or encrypted to protect against leakage of sensitive information. A special unlock procedure (which may involve the laptop manufacturer) can be used to revoke the lock if the laptop is returned to its owner.

Many other items can use the same method to protect against theft. In general, all things which can be disabled from an electronic signal can be disabled using this method. Examples Include:
1. Motorized vehicles—Most vehicles (cars, motorcycles, trucks, boats, etc.) have electronic control systems that could be disabled on demand.
2. Motorized garden equipment—All equipment with electrical control can be disabled on demand
3. Bicycles—Even a bicycle could be disabled using a specialized solution. For example, a lock in the rear wheel could be enabled using the rotational force of the wheel (or using a battery) to activate the lock. Also, lighting could be disabled.
4. Electronic equipment—Most electronic equipment can be disabled on demand. Examples include medical equipment, consumer electronics, etc. Although existing technologies may be capable of disabling phones through a WAN, the possibility to disable all types of equipment even if in the absence of a WAN connection at/for the equipment, and to do so in a cheap and simple way, is very powerful.

Example 3—Home Automation

Many applications for tag control may be used around smart home area. The control actions can be triggered for a number of reasons:
1. An action is created as a result of an explicit user request from the user. For instance, a user application can allow the user to directly control a device using a Graphical User Interface (GUI). Control actions are sent directly to the cloud service from the application.
2. An action is triggered by a sensor tag event received by the cloud service. In this case, it is assumed that a control logic may be created in the cloud service to allow automation through input and output from the cloud service.
3. A third-party application (which may be automatic) may trigger events based on some criteria. For instance, a facility management application (e.g., the third-party application) can adapt facility heating based on the usage patterns of the facility.

Examples of smart home use cases involving tag control include:
1. Automatic plant watering system—Cloud controlled watering can take water supply and future weather forecasts into consideration. The solution may be affordable enough to allow this system even in small scale (e.g., for plant pots).
2. Automatic water shut-off when leakage is detected.
3. Automatic power shut-off when over-heating is detected.
4. Home lighting control—Cloud-controlled lighting control may allow advanced lighting patterns to be employed (e.g., taking weekdays, holidays, and detection of persons into consideration).
5. Home security—Controlling locks, camera surveillance through the cloud may allow flexibility. Home security can be turned on/off automatically by detecting individuals using smart tags as keys.
6. Heating control—Cloud-controlled heating can (e.g., using energy prices and usage patterns) affect heating control.
7. Fire alarms—Fire alarms can be affordably integrated with an alarm service in the event of a fire. Events in nearby apartments/houses can help to determine when the fire alarm should go off. Water sprinklers can be started from the cloud in an effective way.
8. Turn on heating or air conditioning in a home (e.g., a vacation home) before arriving at the home.
9. Turn on a car motor heater when the car is a parked/unoccupied.

In some of the cases above, cloud control may be used for increased capability at a very low cost. Moreover, it will be understood that basic functions in, for example, fire alarms, may not depend exclusively on a cloud-based solution.

Among the benefits of applying the present inventive concepts to various smart home applications is that cloud control may be provided in an inexpensive and simple way. The cloud control may be simple in that it may not need a fixed infrastructure to function (although it can benefit from a fixed infrastructure). The infrastructure may also be simple to set-up because gateways may be anonymous, so a complicated setup against a cloud service or tags may not be required. It may also be cloud-connected, which is in comparison with the pairing with a single phone that is common for Bluetooth 4.0 profiles for sensors. A phone may only need to be set-up once to work with every sensor available.

Example 4—Cloud-Controlled City Infrastructure

Many city infrastructures would benefit from cloud control, even if they may otherwise be difficult and/or expensive to connect to the cloud. Examples of city infrastructures include:
1. City lights—Lights could be adapted to actual patterns of people moving in the area
2. Water supply—Water supply could be shut off if leakage is detected.
3. Traffic lights and signs—Traffic lights and signs could adapt to actual traffic flow. Some of the current vehicle detection sensors (e.g., inductive sensors) could be replaced by smart tags. Pedestrians with a visual impairment could be notified of the traffic light status and possibly also use a tag to request to walk over the street.
4. Electricity distribution—Electricity could be shut off if a shortcut was detected.

Moreover, it will be understood that the tag readers in these examples may be portable electronic devices and/or fixed electronic devices.

Example 5—User Authentication

A tag can be used for different kinds of authentication. The tag can either be public, and used by many, or personal and used by a single user. The tag may also include biometric identification to increase the authenticity of the person identified. A public tag may include a fingerprint sensor where the biometric information is sent to the application server in the cloud through a tag reader/detector. An encrypted "unlock" message can then be sent back through the tag reader/detector to the tag which in turn unlocks a door or performs other action(s). The source tag, tag readers/detectors (up and down from the network cloud) and target tag are all independent and can be different entities, e.g., one tag may be connected to the fingerprint sensor while another is connected to the lock. Tags may also be personal and carried by an individual user (like a credit card or key). Personal tags may include biometrical sensing or include a simple activation button. Cloud issued "unlock keys" may also be targeted to a specific tag reader/detector (and not a tag). For instance a personal password could be encrypted and sent to a tag reader/detector used to login to a specific service (e.g. a social media website login). The unlock key may also be sent directly towards a service. In this case the cloud service itself acts as authentication authority towards the target service. The tag location may be used as one criterion to allow access. Many different policies and use cases are possible dependent on the application.

In some embodiments, a tag may be used as an authentication token. Different kinds of personal authentication tokens are used to authenticate users in applications such as computer login and financial services. Some solutions (e.g., an RSA key) create numbers that are unique at specific times, and the numbers may then be used to verify the authenticity of the user. Other solutions include a secure element that is used to verify the user by some kind of challenge-response pattern. For example, a device may require either the challenge to be input by the user manually through a keypad or may require a connection to the computer (e.g., via Universal Serial Bus (USB)) to allow the challenge/response to be automatically sent through the token. By using cloud-controlled smart tags, a solution can be implemented without requiring the user to enter a challenge/response manually and/or without requiring the token to be connected to the computer. For example, a button, an visual indicator (e.g., a Light Emitting Diode (LED)), a private key, and/or a hash component may be added to the smart tag to make it usable for user authentication.

As an example, a financial service via the Internet may include an option to log-in using a specific authentication tag service. The process could be performed the follows:
1. Identify yourself through a user identity (customer ID or email), and optionally a password, and then select/click "login by smart tag" through the financial services Internet page.
2. A message is displayed that instructs you to push the token button once. This activates the token to send broadcasts with DIRECT_UPLOAD flag set, which overrides broadcast buffering and thus results in a faster communication/transaction.
3. The financial service sends a request to authenticate the specified user to the cloud service.
4. The cloud service sends a control action (e.g., via intelligently-selected tag reader(s)) to the specified tag with a challenge message.
5. A response message is calculated by, e.g., hashing the challenge (among other examples of calculating a challenge response) and a private key in the tag.
6. An LED lights up on the token to indicate that an authentication request has been received.
7. The user presses the button to confirm the authentication request. If not pressed quickly enough, the authentication may time out.
8. The token sends the response for the challenge to the cloud service.
9. The cloud service verifies the response and sends an authentication verification back to the financial service.
10. The user is automatically logged-in to the financial service.

One of the proposed solutions to handle randomized ID broadcast messages for tags is to pre-install randomized IDs at manufacture time. The randomized IDs will be used in a predetermined (e.g., known by the tag and the cloud) order. For example, the next (still unused) ID can be used as the private key for the challenge-response calculation. In this way, no specific private key may need to be used for authentication tokens. The tag may also include a fingerprint sensor that may allow a fingerprint to be sent as part of the response sent to the cloud. Moreover, it will be understood that the authentication request may only be valid for a short period of time.

Example 6—Cloud-Controlled Facility Door Locks

Tag control may be used to unlock doors on a large facility, such as a mall. This scenario involves two steps. First, the unlock action must be verified by the solution in a secure way. Secondly, the unlock action must be executed in one or more physical doors. A physical lock/unlock device is equipped with a smart tag that allows sensor messages to be sent to the cloud. The unlock device may be equipped with a keypad (e.g., for entering a pin code), a bio-metric sensor device (e.g., a fingerprint sensor) and a unlock action button. When the unlock button is pressed by a user, the optional sensor data (e.g., biometric data, pin code, etc.) may be sent as part of the unlock-request sensor data. The sensor message is relayed to the cloud through any tag reader device (possibly including the mobile terminal of the person operating the physical lock).

A special cloud service verifies the "unlock request" (by checking additional sensor data) and reply to suitable tag readers with an unlock action control command. As the physical locks can be distributed over a large area several unlock request may have to be sent to different tag readers. One nice side-effect is that doors may be unlocked by peoples mobile phones when they enter to the doors outside the mall.

There are alternatives to using a physical lock device on the facility. For example, it is possible to use a completely-virtual lock application in a phone. In this case, the lock application requests the unlock action directly (or indirectly through a third-party service) toward the cloud service. Another solution may use a physical lock device on the facility, but may, for instance, use the phone as a user interface to enter a pin code.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. A method of operating a short-range Radio Frequency (RF) device, comprising:
   transmitting, to an anonymous portable electronic device that is anonymous to the short-range RF device, identification information that identifies the short-range RF device, using a short-range RF communication protocol; and
   receiving a command, responsive to the identification information, from a server via a first device or the anonymous portable electronic device using the short-range RF communication protocol to control a second device associated with the short-range RF device.

2. The method of claim 1, wherein transmitting the identification information comprises:
   transmitting sensor information generated by a sensor associated with the short-range RF device and encrypted identification information that identifies the short-range RF device.

3. The method of claim 1, wherein transmitting the identification information comprises:
   transmitting, from the short-range RF device, encrypted identification information that identifies the short-range RF device at least twice before receiving the command from the server.

4. The method of claim 1, wherein:
   the first device comprises a first portable electronic device communicating with the short-range RF device using a first short-range RF communication link; and
   transmitting the identification information comprises transmitting encrypted identification information that identifies the short-range RF device to a second portable electronic device, comprising the anonymous portable electronic device, using a second short-range RF communication link.

5. The method of claim 4, wherein:
   at least one of the first and second short-range RF communication links with the short-range RF device is initiated and used independently of any user input at a respective one of the first and second portable electronic devices; and
   receiving the command comprises receiving the command via the second portable electronic device and the first portable electronic device.

6. The method of claim 1, wherein transmitting the identification information comprises:
   transmitting encrypted identification information that identifies the short-range RF device and an unencrypted indication to at least one device to directly forward the encrypted identification information to the server or another server without buffering the encrypted identification information in the at least one device.

7. The method of claim 1, wherein the identification information is destined for the server and/or another server.

8. The method of claim 7, wherein the command from the server comprises identification information that identifies the short-range RF device and a control command to be executed by the second device.

9. The method of claim 8, wherein the identification information received from the server comprises a plurality of identities of the short-range RF device.

10. The method of claim 8, wherein receiving the command from the server comprises:
    receiving a command identifier associated with the command, the method the further comprising:
    verifying, using the command identifier, that the command has not previously been received and/or executed since transmitting the identification information.

11. The method of claim 2, wherein transmitting the encrypted identification information comprises:
    indiscriminately broadcasting the encrypted identification information, using the short-range RF communication protocol, such that at least the anonymous portable electronic device will receive the encrypted identification information.

12. The method of claim 1, wherein:
    the short-range RF device comprises a tag;
    the anonymous portable electronic device comprises an anonymous tag reader;
    transmitting comprises transmitting, from the tag to the anonymous tag reader, the identification information that identifies the tag, using the short-range RF communication protocol; and
    receiving comprises receiving the command, responsive to the identification information, from the server via the first device or the anonymous tag reader using the short-range RF communication protocol to control the second device associated with the tag.

13. The method of claim 1, wherein:
the anonymous portable electronic device comprises one anonymous portable electronic device among a plurality of anonymous portable electronic devices in an anonymous network;
the identification information comprises one identity among a plurality of identities of the short-range RF device; and
transmitting comprises transmitting the plurality of identities of the short-range RF device from the short-range RF device to the anonymous network in a predetermined order, using the short-range RF communication protocol.

14. A short-range Radio Frequency (RF) device, comprising:
a transmitter configured to transmit, to an anonymous portable electronic device that is anonymous to the short-range RF device, identification information that identifies the short-range RF device, using a short-range RF communication protocol; and
a receiver configured to receive a command, responsive to the identification information, from a server via a first device or the anonymous portable electronic device using the short-range RF communication protocol to control a second device associated with the short-range RF device.

15. The short-range RF device of claim 14, wherein the transmitter is configured to transmit sensor information generated by a sensor associated with the short-range RF device and encrypted identification information that identifies the short-range RF device.

16. The short-range RF device of claim 14, wherein the transmitter is configured to indiscriminately broadcast the identification information using the short-range RF communication protocol.

17. The short-range RF device of claim 14, wherein:
the first device comprises a first portable electronic device configured to communicate with the short-range RF device using a first short-range RF communication link; and
the transmitter is configured to transmit the identification information to a second portable electronic device, comprising the anonymous portable electronic device, configured to communicate with the short-range RF device using a second short-range RF communication link.

18. The short-range RF device of claim 14, wherein:
the short-range RF device comprises a tag;
the anonymous portable electronic device comprises an anonymous tag reader;
the transmitter is configured to transmit, from the tag to the anonymous tag reader, the identification information that identifies the tag, using a short-range RF communication protocol; and
the receiver is configured to receive the command, responsive to the identification information, from the server via the first device or the anonymous tag reader using the short-range RF communication protocol to control the second device associated with the tag.

19. The short-range RF device of claim 14, wherein:
the anonymous portable electronic device comprises one anonymous portable electronic device among a plurality of anonymous portable electronic devices in an anonymous network;
the identification information comprises one identity among a plurality of identities of the short-range RF device; and
the transmitter is configured to transmit the plurality of identities of the short-range RF device from the short-range RF device to the anonymous network in a predetermined order, using the short-range RF communication protocol.

* * * * *